UNITED STATES PATENT OFFICE.

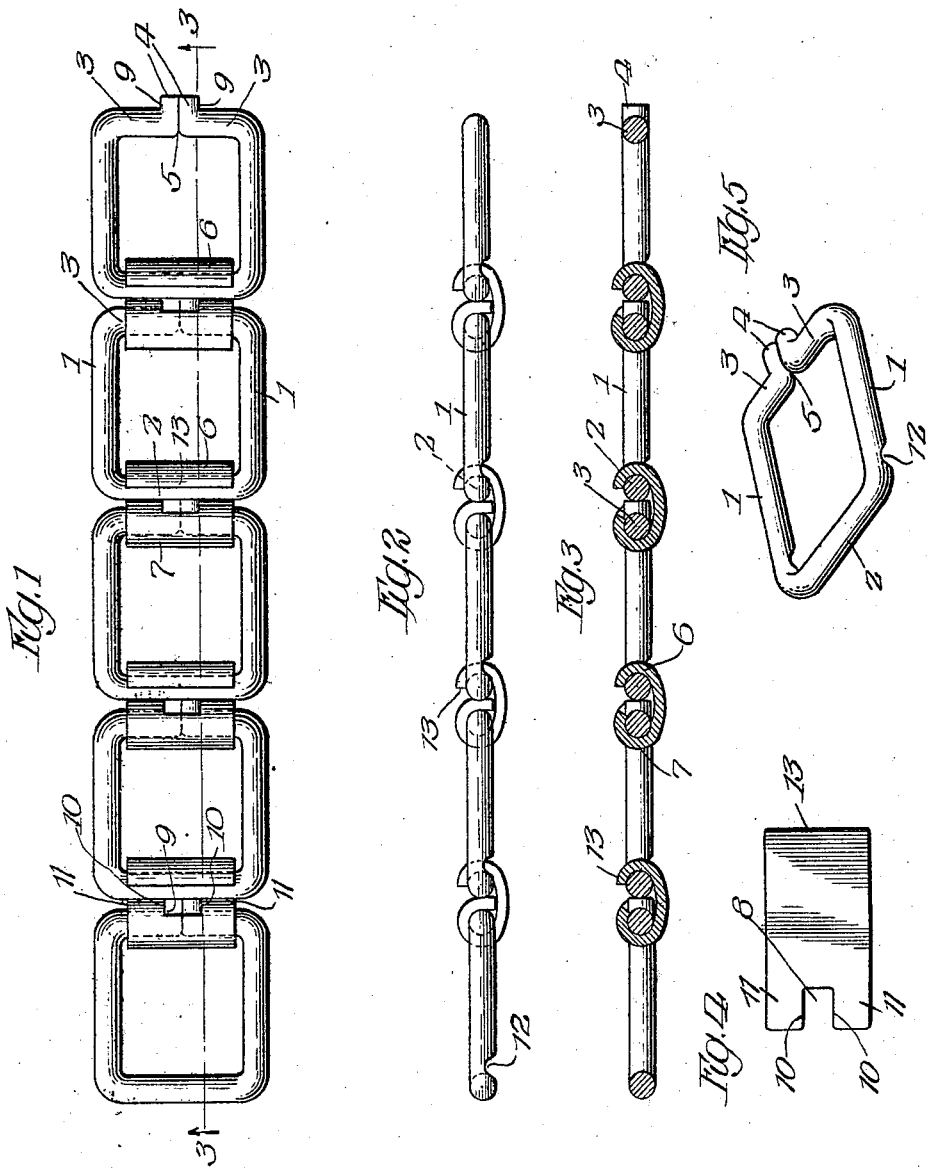

RAYMOND W. DULL, OF CHICAGO, ILLINOIS.

LINK BELT.

1,411,995. Specification of Letters Patent. Patented Apr. 4, 1922.

Application filed June 20, 1919, Serial No. 305,551. Renewed February 17, 1922. Serial No. 537,359.

*To all whom it may concern:*

Be it known that I, RAYMOND W. DULL, a citizen of the United States of America, and a resident of Chicago, Illinois, have invented a certain new and useful Improvement in Link Belts, of which the following is a specification.

This invention relates to link belts for use in transmitting power, in any suitable or desired manner, such as those employed for example, in the construction of endless conveyers or elevators, and for various other similar purposes.

Generally stated, the object of the invention is to provide an improved construction whereby link belts of this general character may be manufactured in large quantities by machinery, without the necessity of manually assembling the links, so that the cost of production will be materially reduced, and whereby the chain will at the same time be strong and serviceable in use.

It is also an object to provide certain details and features of construction tending to increase the general efficiency and the serviceability of a link belt of this particular character, and having certain other advantages, as will hereinafter more fully appear.

To these and other useful ends the invention consists in matters hereinafter set forth and claimed and shown in the accompanying drawings, in which—

Fig. 1 is a plan of a portion of a link belt embodying the principles of the invention.

Fig. 2 is a side elevation or edge view of said belt.

Fig. 3 is a longitudinal section on line 3—3 in Fig. 1.

Fig. 4 is a plan of the sheet metal blank from which the intermediate links are made.

Fig. 5 is a perspective of one of the alternate links which are made from rods or wires.

As thus illustrated, each alternate link is made from a rod or wire of suitable length and has parallel sides 1, a continuous transverse or end portion 2, and transverse end portions 3 which have out-turned ends 4 formed by bending the ends of the rod or wire together. Thus a joint 5 is formed where the two ends of the rod or wire are brought together and bent outwardly, and this joint may be narrow or wide, depending upon the requirements; but, as shown, the joint is narrow, and preferably formed by bringing the two end portions of the rod or wire entirely together, or as close as possible.

The intermediate or sheet metal links are formed from blanks such as the one shown in Fig. 4, and each sheet metal link has a curved end portion 6 which extends partially around the end portion 2 of one of the alternate links, and a curved end portion 7 which extends around the portions 3 of the alternate link. The portion 7 is also provided with a notch 8 to receive the end portions 4 of the alternate link, so that the shoulders 9—9 formed at opposite sides of the joint 5 are engaged by the edges 10—10 of said notch, thus preventing said joint from spreading or opening when the chain or link belt is under strain.

With this construction, each sheet metal link is free to turn on the portion 2 of one of the alternate links, and thus has free articulation at this point, but with the construction shown each sheet metal link is locked, or practically locked, against pivotal motion or articulation relatively to the end portion 3 of the other alternate link, so that the end portions 2 practically provide the only pivotal points or points of articulation in the chain which forms the link belt.

The sheet metal links are preferably as short as possible, so that the portions 2 are each held between the portions 6 and the down-turned end portions 11—11 of the sheet metal links, and the ends of the portions 4 of each alternate link are also close to the end portion 2 of the adjacent alternate link. Thus a very strong and effective connection is provided between the alternate links.

The alternate links are cheaply and economically made from rods or wires, as stated, and afford added strength, inasmuch as the fiber of this sort of metal always extends lengthwise of the rod or wire, as is well known, so that the links are not liable to break or split at their corners. The sheet metal for the intermediate link is easily converted into blanks which are then bent to engage the alternate links.

The links are effectively connected together, but preferably each alternate link has a notch 12 at one side thereof to permit the edge 13 of the sheet metal link to pass through and slide outwardly, by turning the two links at right angles to each other, whereby the chain can be taken apart for the purpose of substituting new links when breakage occurs.

What I claim as my invention is:

1. In a link belt, the combination of alternate links formed from rods or wires bent to provide open links of general rectangular form, the ends of said links being close together, and intermediate links of sheet metal bent to engage the transverse end portions of said alternate links, with portions of the sheet metal inserted edgewise in the small spaces left between the adjacent ends of said alternate links, thereby to form a chain of articulated links which constitute the belt.

2. A link belt as specified in claim 1, said alternate links each having one end thereof formed with a joint where the ends of the rod or wire are turned out and brought together, and with a shoulder formed externally at each side of the joint, and each intermediate link having means to engage said shoulders to prevent spreading or opening of the joint when the belt is under strain.

3. A link belt as specified in claim 1, each intermediate link being substantially held against articulation relatively to one alternate link, and being adapted to articulate freely relatively to the other alternate link connected thereto.

4. A link belt as specified in claim 1, one or more of said alternate links having a joint formed where the ends of the rod or wire are turned out and brought together, and one or more of the intermediate links having a notch to receive the out-turned ends of the rod or wire, thereby to keep the joint from spreading or opening when the belt is under strain.

5. In a link belt, the combination of alternate links only slightly spaced apart, intermediate links to engage the alternate links, forming therewith a chain of links which constitute the belt, and means interposed in the small spaces left between the adjacent ends of the alternate links for preventing pivoted articulation between them and one end of each intermediate link, the other end of each intermediate link being free to articulate freely on one of the alternate links.

6. In a link belt, the combination of alternate links only slightly spaced apart and each having a joint in one end thereof, the joint of each link engaging the next link, and intermediate links having means inserted in the small spaces left between the adjacent ends of the alternate links to prevent spreading or opening of said joint when the belt is under strain.

7. A structure as specified in claim 1, said alternate links having provisions to permit separation from the intermediate links.

8. In a link belt, a series of links each formed from a length of wire bent to bring its ends together, and means to connect said links and hold said ends thereof together to prevent the joint thus formed in each link from opening under strain, with spacing means on each wire link to engage the next link, said spacing means comprising the out-turned projecting ends of the wire on one transverse end portion of each link.

9. In a link belt, the combination of alternate links formed from rods or wires bent to provide open links of general rectangular form, and intermediate links of sheet metal bent to engage the transverse end portions of said alternate links, thereby to form a chain of articulated links which constitute the belt, said alternate links each having one end thereof formed with a joint where the ends of the rod or wire are turned out and brought together, and with a shoulder formed externally at each side of the joint, and each intermediate link having means to engage said shoulders to prevent spreading or opening of the joint when the belt is under strain.

10. In a link belt, the combination of alternate links formed from rods or wires bent to provide open links of general rectangular form, and intermediate links of sheet metal bent to engage the transverse end portions of said alternate links, thereby to form a chain of articulated links which constitute the belt, one or more of said alternate links having a joint formed where the ends of the rod or wire are turned out and brought together, and one or more of the intermediate links having a notch to receive the out-turned ends of the rod or wire, thereby to keep the joint from spreading or opening when the belt is under strain.

RAYMOND W. DULL.